United States Patent
Almgren et al.

(10) Patent No.: US 8,526,877 B2
(45) Date of Patent: Sep. 3, 2013

(54) ADAPTIVE RADIO REPEATERS

(75) Inventors: Magnus Almgren, Sollentuna (SE); Per Skillermark, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 352 days.

(21) Appl. No.: 12/747,803

(22) PCT Filed: Dec. 14, 2007

(86) PCT No.: PCT/EP2007/063942
§ 371 (c)(1), (2), (4) Date: Jun. 11, 2010

(87) PCT Pub. No.: WO2009/076995
PCT Pub. Date: Jun. 25, 2009

(65) Prior Publication Data
US 2010/0261425 A1    Oct. 14, 2010

(51) Int. Cl.
*H04B 3/36* (2006.01)
(52) U.S. Cl.
USPC .............................................. 455/8; 455/10
(58) Field of Classification Search
None
See application file for complete search history.

(56) References Cited

U.S. PATENT DOCUMENTS

| | | | |
|---|---|---|---|
| 4,713,809 A | 12/1987 | Mizota | |
| 7,062,224 B2 | 6/2006 | Baker et al. | |
| 7,236,470 B1 | 6/2007 | Bims | |
| 7,929,988 B2 * | 4/2011 | Horiuchi et al. | 455/11.1 X |
| 2004/0224631 A1 | 11/2004 | Davis et al. | |
| 2005/0048914 A1 | 3/2005 | Sartori et al. | |
| 2006/0166618 A1 | 7/2006 | Bakaimis | |
| 2006/0193280 A1 | 8/2006 | Lee et al. | |
| 2006/0252367 A1 | 11/2006 | Haartsen | |
| 2007/0015462 A1 | 1/2007 | Dean et al. | |

FOREIGN PATENT DOCUMENTS

GB    2316578 A    2/1998

\* cited by examiner

*Primary Examiner* — Philip Sobutka
(74) *Attorney, Agent, or Firm* — Coats & Bennett, P.L.L.C.

(57) ABSTRACT

One method for controlling operation of a repeater in radio communication system comprises determination whether operation of a node in the radio communication system benefits from assistance of a repeater and transmitting, from the node in the radio communication system, a radio signal to the repeater being indicative of an order to promptly activate the repeater if the benefit exists. One complementary method for controlling operation of a repeater in radio communication system comprises detection (252), in the repeater, of a radio signal being indicative of an order to activate the repeater. Amplification in the repeater is activated (254) as a response to such a detected radio signal and uplink traffic from a user terminal being located in a vicinity of the repeater and/or downlink traffic to the user terminal is amplified (256). A repeater, a node, a user terminal and a system operating according to the method are presented.

19 Claims, 9 Drawing Sheets

ADAPTIVE RADIO REPEATERS

TECHNICAL FIELD

The present invention relates in general to wireless radio communication and in particular to repeaters used in wireless radio communication systems.

BACKGROUND

Radio repeaters are used to enhance coverage and capacity of radio networks. In the downlink a radio repeater receives the signal transmitted from the base station, amplifies it and transmits the amplified signal such that it may be received by the terminal. In the uplink the repeater works in the opposite way.

A radio relay is a unit capable of decoding incoming signals and encoding the decoded signals into new signals to be forwarded. The complexity allows typically for reduction of noise and if necessary change of applied modulation and coding. Typically, a relay introduces a certain time delay. A repeater is a simpler piece of equipment that essentially without time delay amplifies and forwards a radio signal. The modulation and coding format of the transmitted signal is always equal to the originally received signal. An operating relay is typically known by the system and registered to a specific base station, while the existence of a repeater may be totally transparent also during operation.

In the published U.S. patent application US 2006/0166618, an adaptive relay management is disclosed. Usage requirements in a cell are evaluated and the number and/or type of relays used in the cell are varied in order to meet the usage demands. Instructions about the required configuration are broadcasted to the relays for configuring/registering thereof. In this way, the system ensures that enough resources are available to meet the user requirements.

Since the output power of a radio repeater may be relatively low in comparison to the output power of a base station, it may often be needed to deploy multiple radio repeaters in a cell in order to provide high data rate coverage in a large part of the cell area. A specific user terminal, however, may typically only hear one or a few of the radio repeaters. Accordingly, when the base station transmits (unicast) data destined to a particular user terminal it would be enough that the radio repeaters that enhance the reception quality of this particular user terminal are active. Other radio repeaters do not improve the reception quality. On the contrary, these repeaters cause unnecessary interference and their transmission consumes power without making any good. Such unnecessary power consumption is in particular a drawback for battery powered repeaters, which may be the case e.g. for some movable repeaters.

A general problem in prior art use of repeaters is thus that the use of repeaters typically causes unnecessary radio signaling, thereby increasing interference and power consumption.

SUMMARY

A general object of the present invention is thus to provide radio communication systems using repeaters, in which radio repeaters may be activated depending on the traffic in the cell. A further object of the present invention is to provide systems and repeaters that only activate repeaters being situated relatively close to an active user terminal. Yet a further object of the present invention is to provide systems and repeaters that deactivate repeaters being situated far from any active user terminal.

The above objects are achieved by methods, devices and systems according to the enclosed patent claims. In general words, in a first aspect, a method for controlling operation of a repeater in radio communication system comprises detection, in the repeater, of a radio signal being indicative of an order to promptly activate the repeater. Amplification in the repeater is activated as a response to such a detected radio signal and uplink traffic from a user terminal being located in a vicinity of the repeater and/or downlink traffic to the user terminal is amplified.

According to a second aspect, a method for controlling operation of a repeater in radio communication system comprises determination whether operation of a node in the radio communication system benefits from assistance of a repeater and transmitting, from the node in the radio communication system, a radio signal to the repeater being indicative of an order to promptly activate the repeater if the benefit exists.

According to a third aspect, a repeater for use in a radio communication system comprises a detector for detecting a radio signal that is indicative of an order to promptly activate the repeater. The repeater further comprises an amplifier arrangement, arranged for amplifying uplink and/or downlink traffic and means for activating the amplifier arrangement. The means for activating the amplifier arrangement is connected to the detector and arranged for activating the amplifier arrangement as a response to such a detected radio signal being indicative of the order. The amplifying operation comprising amplification of uplink traffic from the user terminal and/or amplification of downlink traffic to the user terminal.

According to a fourth aspect, a node for use in a radio communication system, comprises a transmitter, arranged for transmitting a downlink radio signal being indicative of an order to promptly activate a repeater. The radio signal comprises addressing information about the repeater.

According to a fifth aspect, a node for use in a radio communication system comprises a transmitter, arranged for transmitting an uplink radio signal being indicative of an order to promptly activate a repeater. The node is a user terminal.

According to a sixth aspect, a radio communication system comprises at least one repeater according to the third aspect and at least one node according to the fourth or fifth aspect.

A general advantage with the present invention is that unnecessary radio transmitting is reduced in communication systems comprising repeaters and that the total power consumption is reduced. Further advantages of particular embodiments are discussed in connection with respective embodiment.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
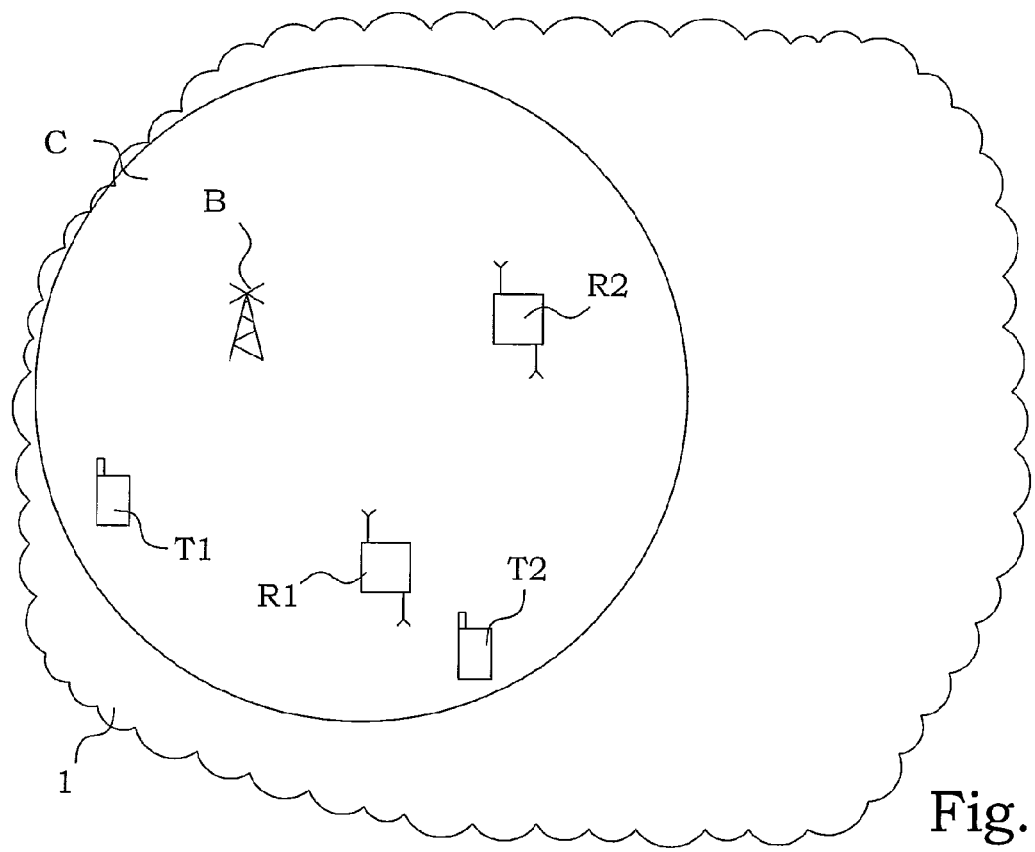
FIG. 1 is a schematic illustration of a use of repeaters in cellular communication systems.

In the drawings, corresponding reference numbers are used for similar or corresponding parts.

In the present disclosure, the terms "repeater" and "relay" are used according to the following meanings. A radio repeater is a simple piece of equipment that essentially without time delay amplifies and forwards a radio signal. The modulation and coding format of the transmitted signal is always equal to the originally received signal. A radio relay is a unit capable of decoding incoming signals and encoding the decoded signals into new signals to be forwarded. The complexity allows typically for reduction of noise and if necessary change of applied modulation and coding. Typically, a relay introduces a certain time delay.

The basic scenario of the present invention is schematically illustrated in FIG. 1. The invention proposes a method for selective activation of radio repeaters deployed in a communication system. FIG. 1 depicts a cell C in a cellular mobile communication system 1 associated with a base station B. In the cell C, two radio repeaters R1, R2 are deployed to enhance the performance. In the example in FIG. 1 a user terminal T2 is situated close to the repeater R1 and would hence benefit of repeater R1 being active. A user terminal T1 is not located nearby any repeater node and does not benefit from the activation of any of the repeater nodes. There is neither any user terminal in the vicinity of repeater R2 and hence in this particular situation repeater R2 is of no use.

Accordingly, in FIG. 1 it would be desirable if repeater R1 is active when traffic is transmitted to/from user terminal T2 but silent otherwise. Repeater R2 should, independent of the traffic, be silent such that no unnecessary interference is caused and the power consumption is kept low. Expressed more general, a repeater should be active when there is traffic to or from a terminal being situated so close to the repeater that the repeater improves the signaling conditions. Otherwise, the repeater should be silent.

In a cellular communication system, there are two parties that have information about the communication quality of a connection between a user terminal and a base station. These parties are the base station (or any node achieving information therefrom) and the user terminal itself. If the signaling conditions are bad, e.g. if the user terminal is far from the base station or is present within an area where the radio signals from the base station is weak, the employment of a repeater is potentially advantageous. In such a case, activation of a suitable repeater would be of interest.

Figure 2:
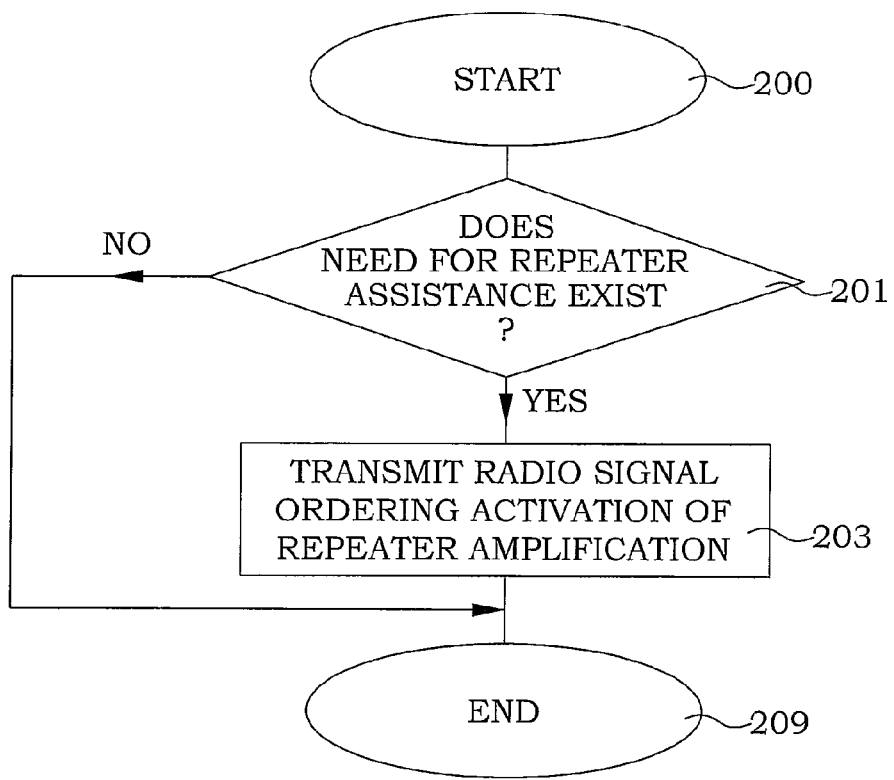
FIG. 2 is flow diagram of steps of an embodiment of a repeater activation method according to the present invention.

FIG. 2 illustrates a flow diagram of an embodiment of a method according to the present invention. The method for controlling operation of a repeater in radio communication system starts in step 200. In step 201, it is determined whether operation of a node in the radio communication system would benefit from assistance of a repeater. If the benefit exists, the procedure continues to step 203, otherwise the procedure is ended in step 209. In step 203, a radio signal is transmitted, from the node in the radio communication system to the repeater. The radio signal is indicative of an order to promptly activate the repeater. The procedure ends in step 209.

Figure 3:
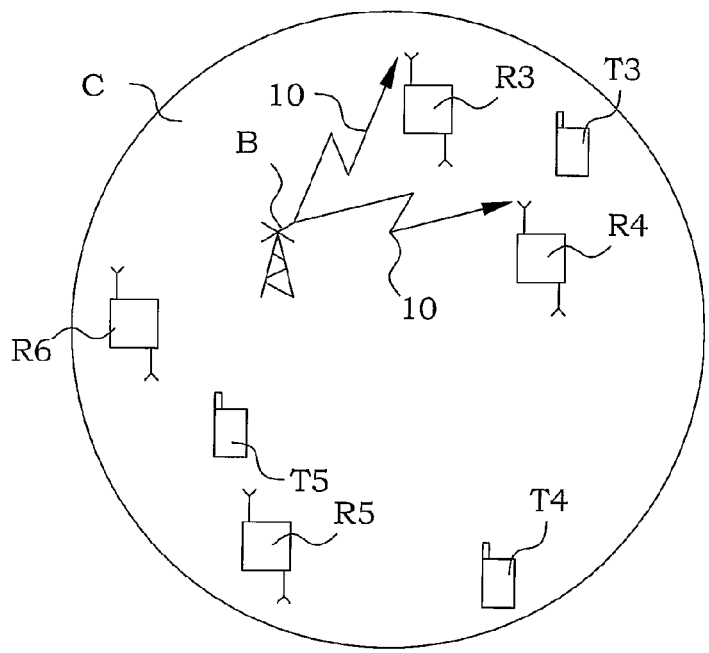
FIG. 3 is a schematic illustration of downlink activation ordering of repeaters in cellular communication systems.

The procedure of FIG. 1 can be performed ether by a node in the stationary part of the communication system, e.g. by a base station, or by a user terminal. The situation, where a base station is the active part is illustrated by FIG. 3. The base station B determines that the radio conditions relative a user terminal T3 are bad and that the communication would benefit from the use of a repeater. A control signal 10 is transmitted downlinks to two repeaters R3 and R4 being situated in the vicinity of the terminal T3. The control signals 10 are addressed to the specific repeaters, in order not to activate repeaters that are not of benefit. Since radio conditions to user terminals T4 and T5 are considered to be good, there is no need for any repeater assistance for that purpose. Repeaters R5 and R6 are therefore preferably not activated. The selection of the repeaters is preferably based on an experience data base described further below.

Figure 4:
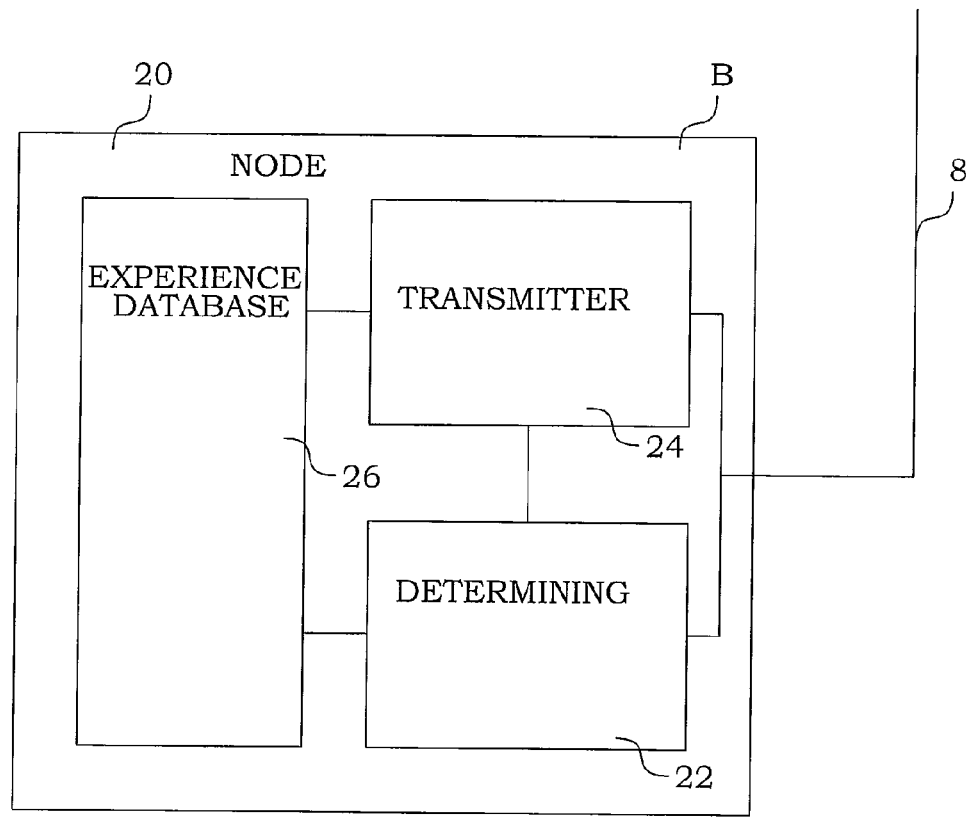
FIG. 4 is block scheme of an embodiment of a node of a cellular communication system according to the present invention.

FIG. 4 illustrates a node 20 for use in a radio communication system. The node 20 is preferably a base station B and is connected to an antenna 8 for communication with connected user terminals. The node 20 comprises means for determining 22 whether operation of the node 20 would benefit from assistance of a repeater. In this embodiment, the means for determining 22 is a radio link quality monitor. If need for repeater assistance is determined, e.g. if a link quality is too low, a transmitter 24 is notified. The transmitter 24 is arranged for transmitting a downlink radio signal indicative of an order to promptly activate a repeater. In the present embodiment, the transmitter 22 is a control message unit, which creates and transmits control messages addressed to the repeaters to be activated. The transmitted radio signal thus comprises addressing information about the intended repeater to be activated. The selection of the repeaters to be addressed is in this embodiment collected from an experience database 26, described further below.

Figure 5:
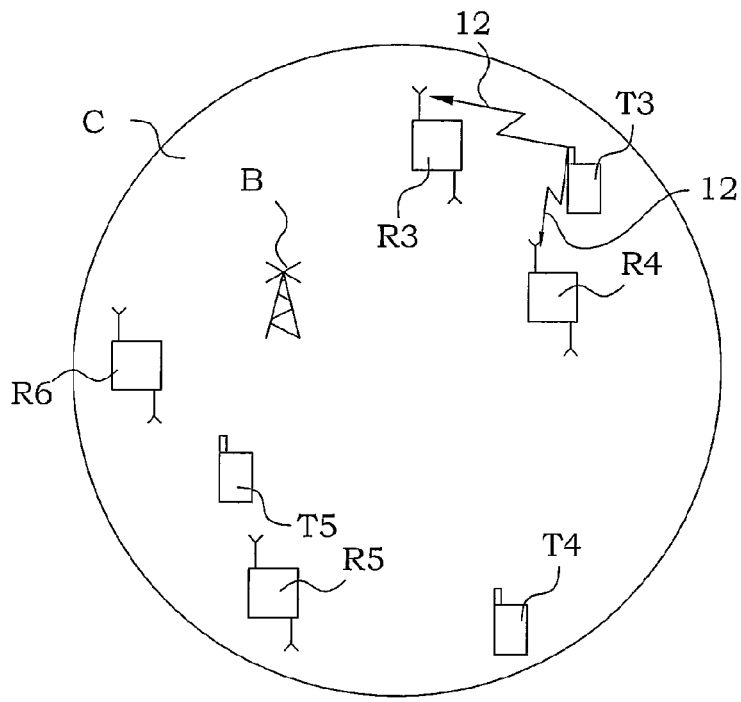
FIG. 5 is a schematic illustration of uplink activation ordering of repeaters in cellular communication systems.

The procedure of FIG. 1 can also be performed by a user terminal. The situation, where a user terminal is the active part is illustrated by FIG. 5. The user terminal T3 has bad radio conditions relative the base station B. This can be discovered during an ongoing session or during an attempt to connect. The communication would benefit from the use of a repeater.

In one embodiment, the user terminal T3 is not aware of if any repeater nodes are located in its vicinity. Hence, if the user terminal T3 assesses that repeater assistance would be beneficial, a signal 12 is transmitted uplinks from terminal T3 indicative to an order to promptly activate any possible repeater being present in the vicinity. In other words, it transmits an activation order, typically a control message, indirectly addressed to all possible repeater nodes. If any repeater node is located close to the user it will pick up the control message and start to amplify and forward the traffic to and/or from the user terminal. The signal 12 may be a very simple message, e.g. just a high power at a predetermined frequency and time. The signal 12 may also be an ordinary control signal. The signals 12 are in this embodiment not addressed to any specific repeaters, but instead, only repeaters being situated in a vicinity of the requesting terminal will be able to notice the control signal, in FIG. 5, repeaters R3 and R4. Since radio conditions to/from user terminals T4 and T5 are considered to be good, there is no need for any repeater assistance for that purpose and terminals T4 and T5 do therefore not transmit any repeater activation control message. Repeaters R5 and R6 are therefore not activated.

In another embodiment, the user terminals are aware of if there are any repeater nodes located in the vicinity. Terminals may get this knowledge e.g. in systems where repeater nodes transmits some known reference signals that the terminals may search for. If the user terminals recognize one of the predefined reference signals it knows that a repeater node is located close nearby and may assess whether this repeater node may be of assistance. In this scenario the user terminal may only transit a control message asking for repeater assistance if it has recognized a repeater node close nearby. Moreover, if the user terminal is aware of the repeater identity one may include this identity in the control message as a specific address.

Figure 6:
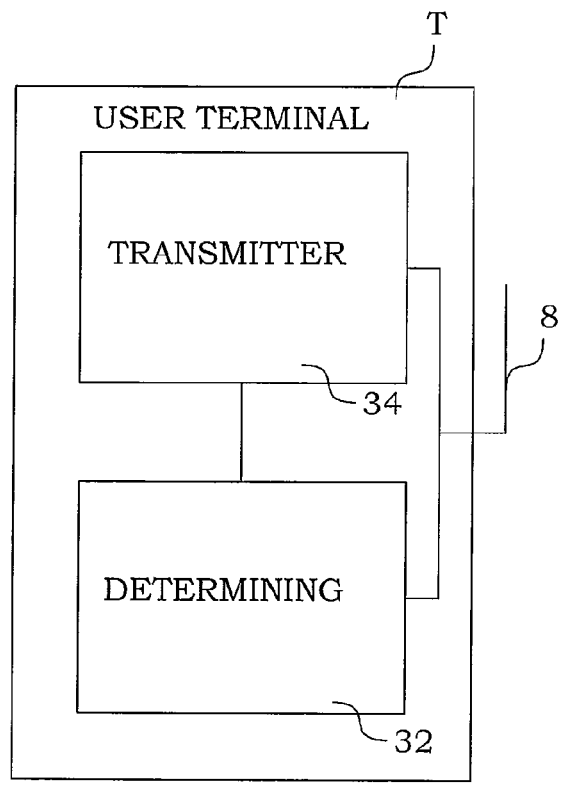
FIG. 6 is block scheme of an embodiment of a user terminal according to the present invention.

FIG. 6 illustrates a user terminal T for use in a radio communication system. The user terminal T comprises means for determining 32 whether the user terminal T is in need of assistance of a repeater. In this embodiment, the means for determining 32 is a radio link quality monitor. If need for repeater assistance is determined, e.g. if the link quality is too low, a transmitter 34 is notified. The transmitter 34 is arranged for transmitting an uplink radio signal indicative of an order to promptly activate a repeater. In the present embodiment, the transmitter 32 is a control message unit, which creates and transmits broadcasted control messages to any repeaters in the vicinity to be activated.

As described above, the need for repeater assistance can be evaluated either in the fixed network or in the user terminal. What measure to use in the evaluation depends on the system and on what measurements that are available in the different nodes. Examples of measurements suitable for this purpose include the output power, the packet error rate, the data rate, the signal-to-interference-and-noise ratio (SINR), and the transport format (modulation and coding scheme).

In many present and upcoming systems, the downlink operates using a fixed output power and adaptive modulation and coding is used to adapt the transmission to the channel conditions. Examples of this type of systems include UTRAN (WCDMA/HSPA) and E-UTRAN (LTE). In this case, e.g. the SINR, the data rate, or the packet error rate can be used to assess the downlink need for repeater assistance. A low SINR, a low data rate or a high packet error rate may be used to trigger repeater activation. The uplink often includes power control that, at least partly, compensates for pathloss differences, i.e. output power is increased when pathloss increases. Hence, apart from the above mentioned measures used in downlink also the uplink output power may be used to trigger repeater activation.

Other systems have links with fixed data rate. In this case, the modulation and coding scheme is typically fixed and a SINR-balancing power control scheme is used to adapt the output power to the match the channel gain. Fore these types of systems it may be suitable to base the repeater activation on e.g. the output power or the packet error rate in both uplink and downlink.

Figure 7:
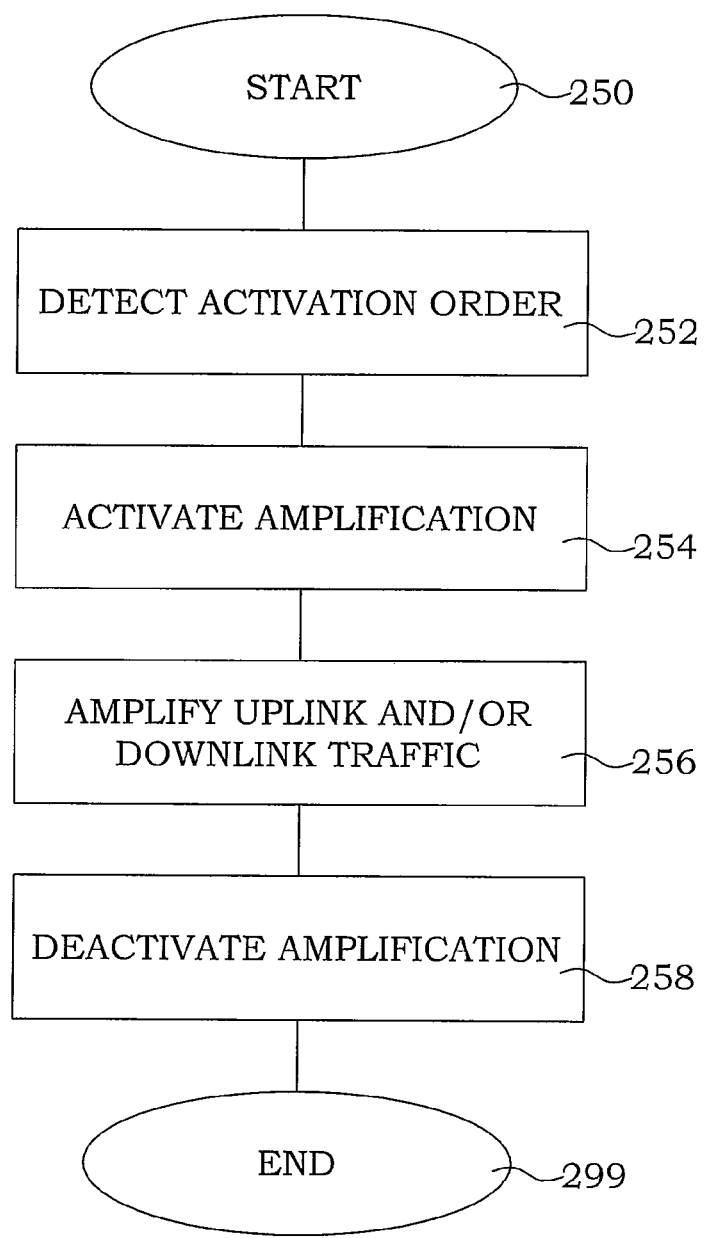
FIG. 7 is flow diagram of steps of an embodiment of a repeater operation method according to the present invention.

FIG. 7 is a flow diagram of steps of an embodiment of a method according the present invention and illustrates what is performed in a repeater. The method for controlling operation of a repeater in a radio communication system begins in step 250. In step 252, a radio signal is detected in the repeater. The radio signal is indicative of an order to promptly activate the repeater.

In step 254, amplification in said repeater is activated promptly as a response to such a detected radio signal. Uplink traffic from a user terminal being located in a vicinity of the repeater and/or downlink traffic to the user terminal is amplified in step 256. This step can be performed according to different alternative approaches, depending on the character of the signaling conditions. In one embodiment, either uplink or downlink signaling to the user terminal in question is extracted, amplified selectively and forwarded to the intended receiver. Such embodiment is useful in situations where the interference situation in uplink and downlink may differ considerably or in cases when the signal strength of the signals received in uplink and downlink differs significantly. The latter may happen when there is a large difference in available output power between the base station (downlink) and the user terminal (uplink). By only amplifying signaling in one direction, additional interference in the other direction may be avoided. In another embodiment, both uplink and downlink signaling to the user terminal is amplified. This may be beneficial if the signaling conditions are more equal between uplink and downlink. A need for repeater assistance in one direction then probably means that there also is a need for repeater assistance in the opposite direction. If the amplification is to be restricted only to the signaling concerning the user terminal in question, the repeater has to be provided with information about allocation principles within the communication system and the cell within it is situated, in order to be able to extract the appropriate signaling. The repeater then also has to comprise processors arranged for performing such extraction tasks. In yet another embodiment, the repeater may instead amplify all uplink and downlink signaling. In such a case, the repeater can be made simpler, but instead the interference situation may deteriorate due to unnecessary amplification. The suitable approach is preferably selected based on the signaling characteristics within the cell in question.

In a preferred embodiment, the detected radio signal being indicative of an order to promptly activate the repeater is a control signal that also comprises information about what signals are to be amplified. In such an embodiment, the node ordering the repeater to be activated can decide exactly what signals that is to be amplified. The selection can e.g. be between uplink and/or downlink traffic, certain defined time or frequency slots or signals of a certain type, e.g. control signaling or non-control signaling. Such selection of signals to be amplified may be performed on a frame basis, i.e. new instructions are transmitted for each frame or group of frames. The selection can also be of an "until further notice" type, i.e. the selection rules are to be applied until new orders are transmitted or the amplification is deactivated. As will be discussed more here below, if the activation order is predetermined to be valid only for a predetermined time period, e.g. a frame, the selection is preferably valid for the same time period.

Note, that if a repeater receives activation orders from more than one node, e.g. both from the base station and a user terminal, the scheme for amplification is preferably the superposition of the individual ordered selection. As an example, if a base station orders that only uplink signals are to be amplified, and a user terminal at the same time request that all downlink signals are to be amplified, the repeater should preferably amplify all radio traffic.

In step 258, the amplification is deactivated. This deactivation can be performed automatically after a pre-determined time period, e.g. after a predetermined number of frame, and in a simplest embodiment, after each frame. An order for a new activation has then to be sent with each frame or group of frames. A definition of the number of frames until deactivation may be included as agreed in a communication standard, or the validity time could be indicated in the control signal itself.

The deactivation can also be trigged by a separate deactivation request from the same node that originally ordered the activation. This may be more suitable in case the repeater activation is initialized in the fixed network. In case the terminal activates the repeater it may not always be possible for the terminal to deactivate the repeater when support no longer is needed. This is the case since terminals are mobile and may move out of reach of the repeater such that it is impossible for the terminal to reach the repeater with a deactivation control message.

In a preferred embodiment, deactivation is also performed after the end of the signaling that is supposed to be amplified, typically with a certain delay time. Such functionality takes care of cases where e.g. a node stops operating correctly before any deactivation order is transmitted, to avoid that the repeater is constantly turned on.

The procedure of the repeater ends in step 299.

Figure 8:
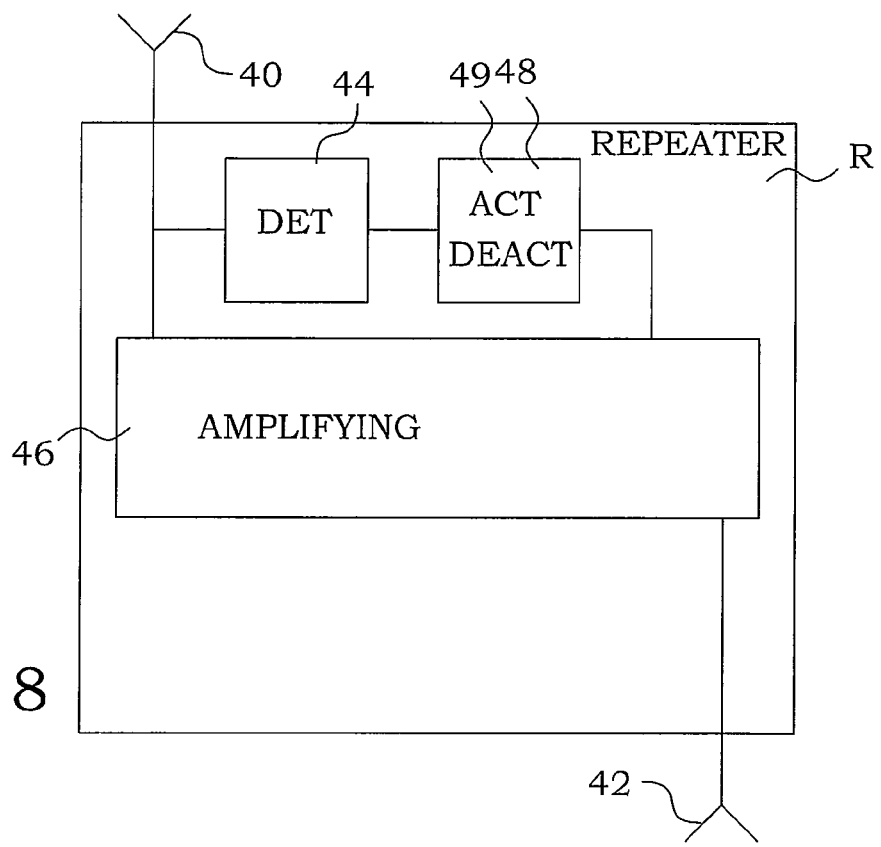
FIG. 8 is block scheme of an embodiment of a repeater according to the present invention.

FIG. 8 illustrates a block diagram of an embodiment of a repeater R according to the present invention. The repeater R is arranged for use in a radio communication system. The repeater R comprises a first antenna 40 and a second antenna 42. In the present embodiment, the first antenna 40 is arranged for receiving downlink radio signals from a base station and for transmitting uplink radio signals to the base station. Also in the present embodiment, the second antenna 42 is analogously arranged for receiving uplink radio signals from user terminals and for transmitting downlink radio signals to the user terminals.

The repeater R further comprises an amplifier arrangement 46. In the present embodiment, the amplifier arrangement 46 is arranged for amplifying both uplink and downlink traffic and is therefore connected to both the first antenna 40 and the second antenna 42. In other words, the amplifier arrangement 46 is arranged to amplify uplink traffic from a user terminal and downlink traffic to the user terminal. The amplifier arrangement 46 operates basically according to any repeater amplifying scheme known as such from prior art. In the present embodiment, the amplifier arrangement 46 assists in amplifying both uplink and downlink signals, which means that arrangements have to be provided for switching between the different directions. If uplink and downlink traffic is present simultaneously, which may be the case in FDD systems, the device may instead comprise two amplifiers. The first amplifier is then used to amplify uplink traffic while the second is used to amplify downlink traffic. Examples of such amplifier arrangements, which would be possible to use together with the present invention can be found e.g. in US 2004/0146013 or US 2007/0015462.

The repeater R comprises a detector 44, connected to the first antenna 40. The detector 44 is in this embodiment arranged for detecting a radio signal that is indicative of an order to promptly activate the repeater. To that end, the detector 44 decodes received control signals from the base station that are addressed to the repeater R.

The repeater R further comprises means for activating 48 the amplifier arrangement 46. The means for activating 48 is connected to the detector 44 and is arranged for activating the amplifier arrangement 46 as a response to a control signal addressed to the repeater detected in the detector 44 indicative of an order to promptly activate the repeater. The means for activating 48 thus controls the operation of the amplifier arrangement 46, in that sense that the amplifier arrangement 46 is not allowed operating if not having an approval from the means for activating 48.

The repeater R also comprises a means for deactivating 49 the amplifier arrangement. As discussed above, deactivation can be performed according to different principles. One approach is that the activation control signal comprises information of an ordered duration of the amplification. In such an embodiment, the means for deactivating 49 is arranged for extracting this information from the detector 44 and keeping track of the operation time or number of frames during which the amplifier arrangement is active. When the ordered time or number of frames is over, the means for deactivating 49 stops the operation of the amplifier arrangement 46.

In another approach, a standard validity time is set, e.g. through a communication standard. In such a case, the means for deactivating 49 always has this information available and keeping track of the operation time or number of frames during which the is active. When the standard time or number of frames is over, the means for deactivating 49 stops the operation of the amplifier arrangement 46.

In yet another approach, a particular deactivation control signal has to be received. In such an embodiment, the detector 44 is arranged also for detecting deactivation control signals and for providing the means for deactivating 49 with information about any received such control signal. When such information is received, the means for deactivating 49 stops the operation of the amplifier arrangement 46.

In addition to the above approaches, amplification may also be stopped when the concerned traffic ends. To this end, the means for deactivating 49 keeps track on the traffic to or from the user terminal(s) in question and when the traffic ends, the operation of the amplifier arrangement 46 is stopped. As discussed above, a simple arrangement is to apply a certain delay time after a last radio signal to and/or from the user terminal. In such a case, the means for deactivating 49 simply comprises a time-out clock, which is reset at each received radio signal to and/or from the user terminal. When the traffic ends, the amplifier arrangement 46 will be turned off with a certain delay.

In an alternative embodiment, the repeater R of FIG. 8 could be arranged for detecting uplink radio signals, and determine whether the uplink radio signals are indicative of an order to promptly activate a repeater. In such an embodiment, the first antenna 40 is arranged for receiving uplink radio signals from a user terminal and for transmitting downlink radio signals to the user terminal. Also, the second antenna 42 is analogously arranged for receiving downlink radio signals from the base station and for transmitting uplink radio signals to the base station.

Figure 9:
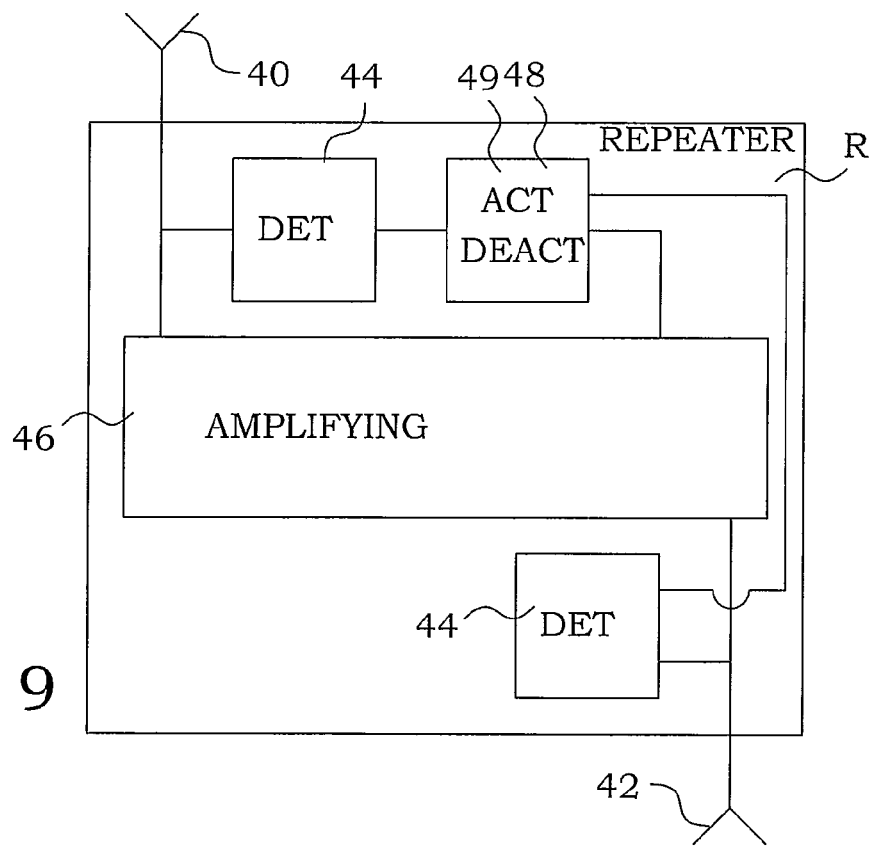
FIG. 9 is block scheme of another embodiment of a repeater according to the present invention.

These two approaches could also be combined, as illustrated in FIG. 9. Here, two detectors 44 are present, monitoring one signaling direction each, and any of the detectors 44 may inform the means for activating 48 that a relevant radio signal has been received.

Figure 10A:
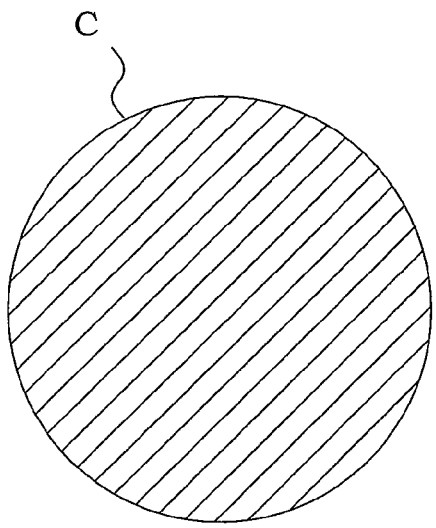
FIGS. 10A-C illustrate signal strengths in cells where different deployment techniques are used.
Figure 10B:
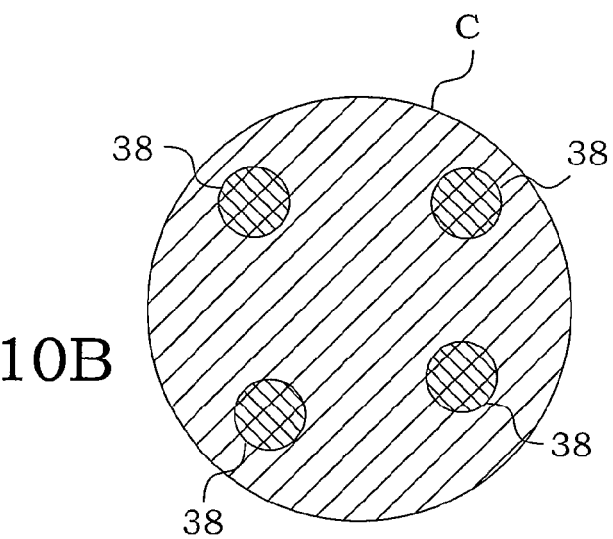
Figure 10C:
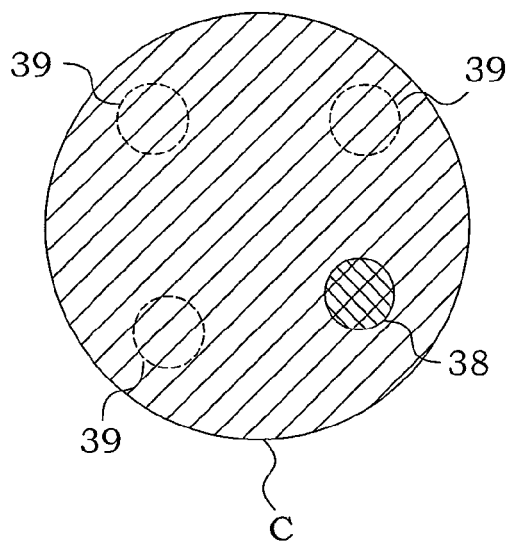

FIGS. 10A-C depict the signal strength in a cell in which three deployment techniques have been used. In the case of FIG. 10A, a base station in the middle of the cell is used to provide coverage. In the case of FIG. 10B, the cell comprises one base station and four radio repeaters. The repeaters are constantly active, giving rise to additional signal strength 38. FIG. 10C, finally, illustrates a situation in which repeaters are selectively activated triggered by the traffic. In the particular situation illustrated in FIG. 10C, one radio repeater is active giving rise to additional signal strength 38, while the other are silent (as illustrated by the broken circles 39). The invention aims at this latter case of FIG. 10C.

In a case, where the communication system has full control over the positions and addresses of the repeaters within its coverage area, the selection of repeaters to be activated can be based on the position information. Any location-related information that is achievable for the user terminal can then be used for selecting a proper repeater or set of repeaters. If an accurate position is available, such a selection becomes quite straight-forward. However, in other cases, only direction information may be available, which makes the selection less accurate. Moreover, other location-related information, such as any characteristic radio signal disturbances may be used for selection purposes. In a general view, any information in the signaling space can be used in order to find a suitable set of repeaters to contact.

In a typical case, however, the communication system does not have full control over the existence and the distribution of any repeaters within the different cells. This is due to the fact that repeaters typically are quite small and simple pieces of equipment, which means that even actors other than network operators can have interest in providing such equipment. Repeaters may be provided at different locations within a cell without the knowledge of the system operator. Repeaters may also be available only part of the time or they can be removed completely or just moved in position. However, normally, an available address space intended for repeaters may be available in the communication system.

Figure 11:
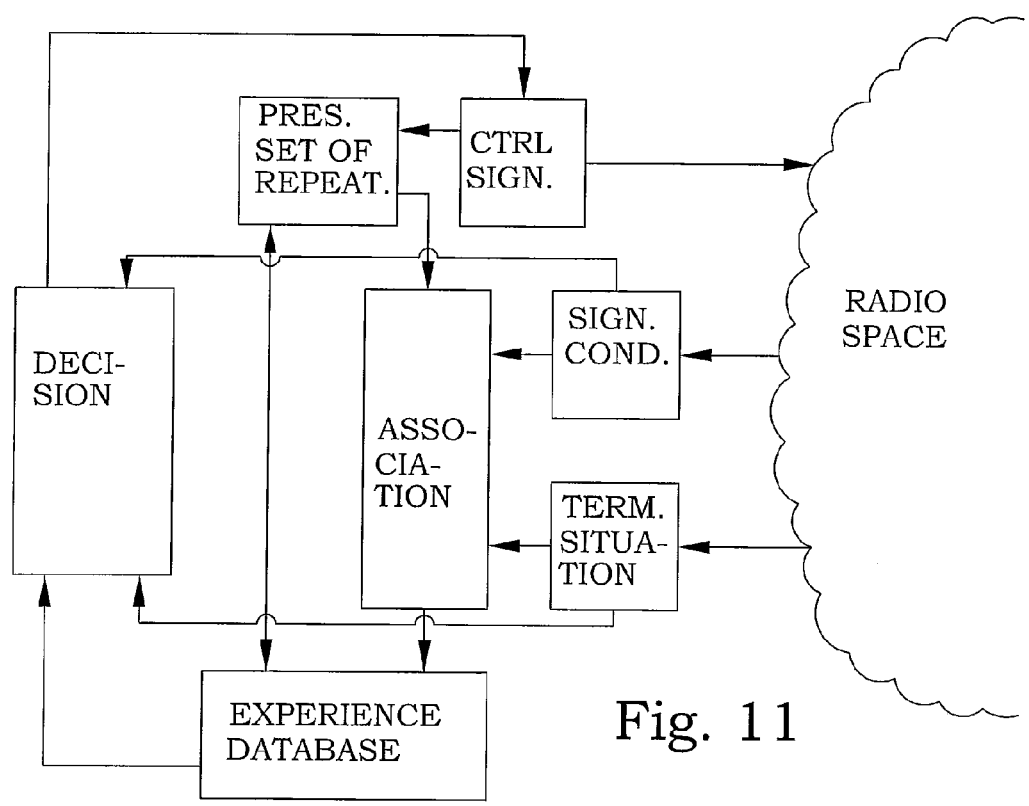
FIG. 11 is a schematic illustration of information flow connected with creation of an experience database.

In a preferred embodiment of the present invention, an experience database can be collected and used for future selection of repeaters. FIG. 11 illustrates in a schematic manner information flows connected with such experience database. A radio space 50 cellular communication is used for communication between user terminals and base stations. Information about signaling conditions 54 for certain user terminals can be extracted from the radio space 50. Similarly, location-related information 52 about the user terminal can also be extracted, such as position, direction or signaling situation in general. A present used set of repeaters 56 is also known, by keeping track on any control signal information 58 that is sent to repeaters. The present used set of repeaters 56, the signaling conditions 54 and the location-related information 52 is input into an association process 60. The results from the association are compiled in an experience database 26.

When a need for repeater assistance is concluded, the present signaling conditions 54 and the present location-related information 52 associated with the user terminal are typically available. By using this information, possibly together with information about whether any repeaters presently are used, can serve as an input for selecting a proper choice of repeaters to activate. A decision 62 of a preferred set of repeaters can be provided to be included in the control signal information 58 and when the control signals are transmitted also as a present set of active repeaters. In this way, an experience database can successively be built up, and by providing suitable forgetting mechanisms, the database can be kept up-to-date.

In a preferred operation method, the experience database can also be built-up intentionally. A very oversimplified example can serve for explanation purposes in connection with FIG. 12. Assume that an address space of 16 repeater addresses is available. The system knows nothing about the position of the repeaters, not even if they at all exist. A signal quality Q is found to be low for communication with a certain user terminal, i.e. the need for repeater assistance is present. At time t0, the base station transmits orders for activating all available repeaters for a period of $\Delta t$. The signaling conditions were found to be improved by such a measure. A conclusion can be made that at least one of the repeaters was situated at a suitable location for assisting the user terminal. At time t1, new control signals are transmitted, which order repeaters No. 1-8 to continue to operate for the next period of time. The improvement in quality remains, which indicates that repeaters 9-16 did not contribute to the improvement. At time t2, new control signals are transmitted, which order repeaters No. 1-4 to continue to operate for the next period of time. Now, the improvement disappeared. At time t3, new control signals are transmitted, which instead order repeaters No. 5-6 to operate for the next period of time. The improvement is still missing. At time t4, new control signals are transmitted, which instead order repeater No. 7 to operate for the next period of time. Now, the improvement is back. A conclusion can be made, that repeater No. 7 was the appropriate one for the present situation. Note, that the system still does not know the exact position of repeater No. 7. The information that repeater No. 7 is beneficially used is now associated with all available signal condition information and location-related information and preferably also other information such as time of the day, type of user terminal and even subscriber identity and provided to an association algorithm for improving the experience data-base. The next time a user terminal presents similar conditions, the system may conclude that repeater No. 7 is a good candidate to assist.

The approach described above provides a relative fast search of alternatives, but may in general cause unnecessary high power utilization, i.e. may cause interference problems at other places in the network. This may be avoided if activation orders may be accompanied by information about requested power levels. Another approach can then be to first activate all repeaters on a predetermined low power level. This power level may even be repeater specific. If a quality enhancement can be observed for the link in question, a selection starts. If no quality enhancement is observed, the power is successively increased, e.g. by stepping it up by predetermined power values until either a predetermined upper power value threshold is exceeded or a quality increase is observed. If no quality increase whatsoever is observed, one may conclude that no suitable repeater is available and the procedure may be stopped.

Figure 12:
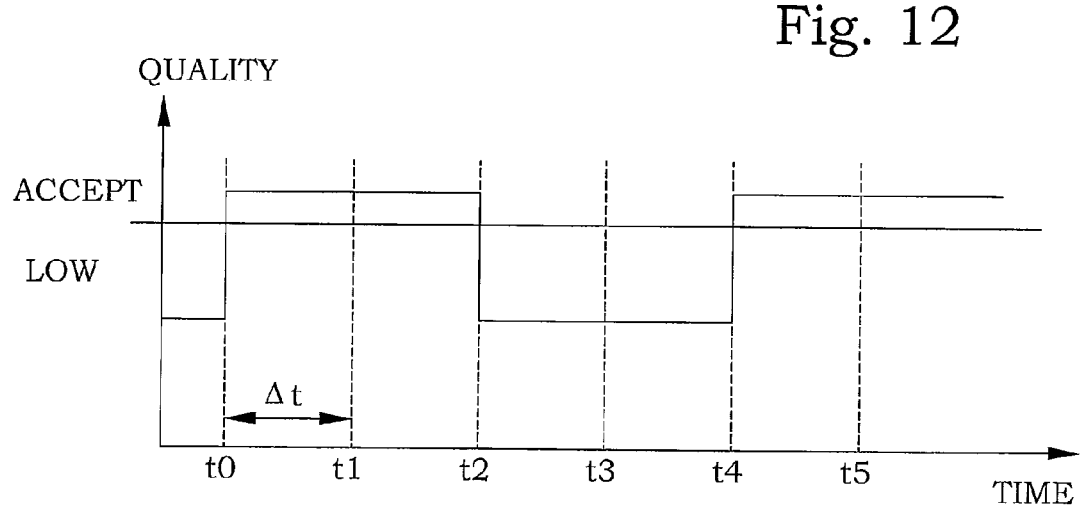
FIG. 12 is schematic illustration of a possible evolution of communication quality with during creation of data for an experience database.
Figure 14:
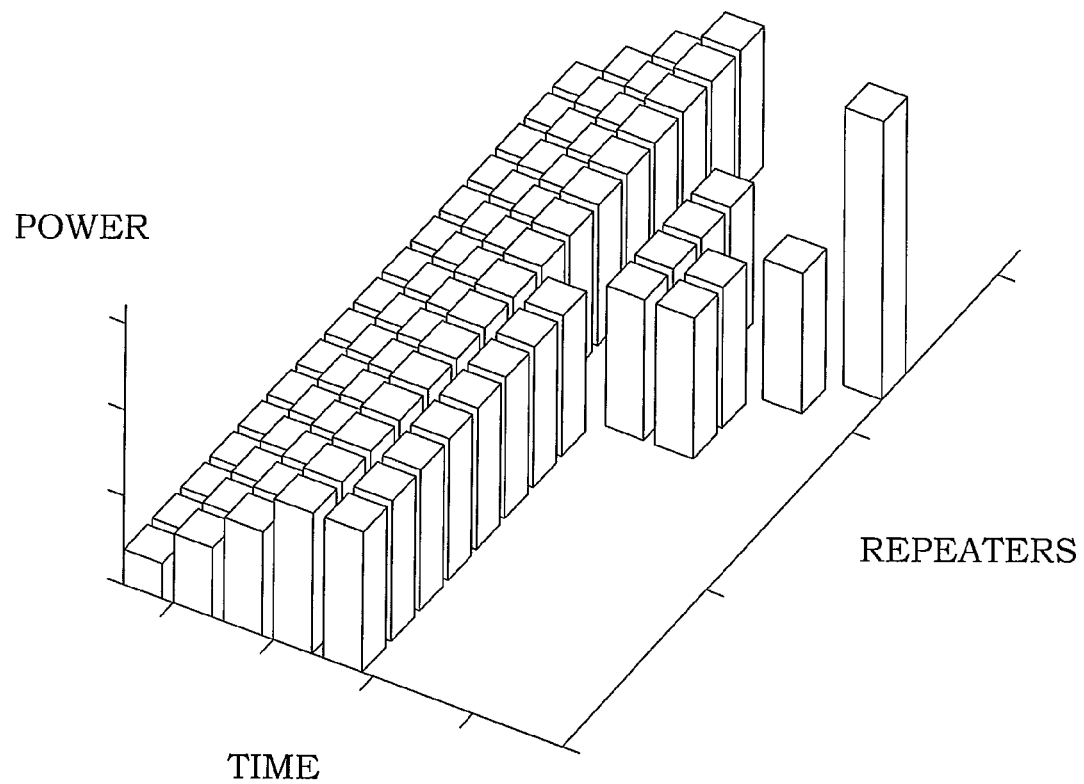
FIG. 14 is a diagram illustrating another embodiment of a repeater activation evolution according to the present invention.

When a quality increase has been observed, a binary search according to FIG. 12 may be performed until only one repeater is left. The power level of this remaining repeater may then be adapted until an acceptable quality is reached with an as low power as possible. FIG. 14 illustrates a repeater activation evolution according to these ideas.

If the system has stored historical data about which repeaters that have been used in different situations, the system may benefit from changing the binary search to a sequential search instead. In such approach, the repeater that in the past most frequently has been of use to terminals is activated. If a quality increase is observed, the search is stopped and a power level adaptation can be performed, if any. If no quality increase is observed, the next repeater in the list of most frequently used repeaters is activated. The procedure is repeated until a quality increase is observed or all repeaters have been explored.

The order of the repeaters in the list of most frequently used repeaters may be dependent on e.g. some signaling, hardware or geographical conditions. Such conditions may e.g. be an interference level, an approximate direction of the link, the type of user terminal to be assisted etc. Different lists may then be provided for different conditions.

Figure 13:
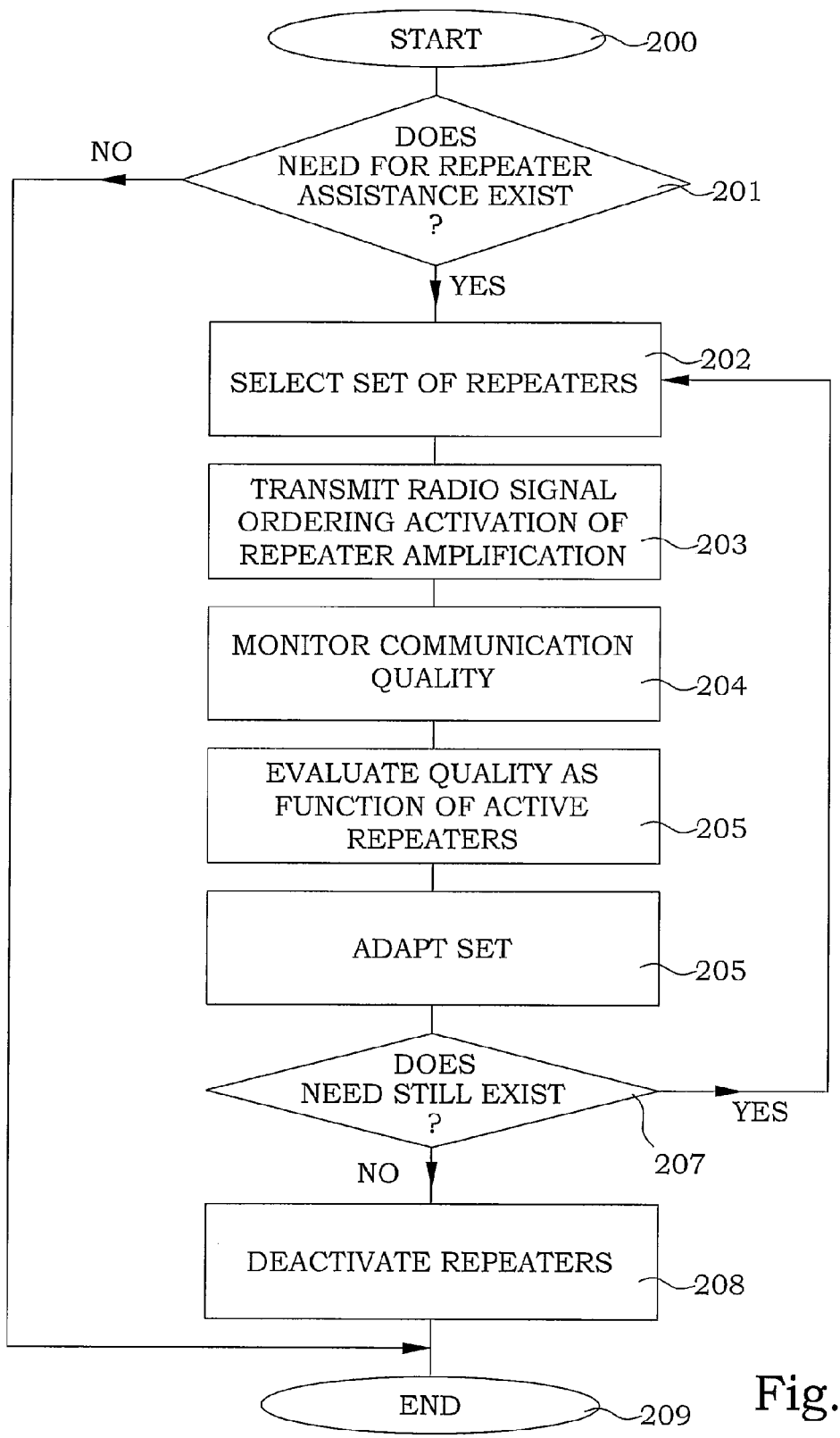
FIG. 13 is flow diagram of steps of another embodiment of a repeater activation method according to the present invention.

FIG. 13 illustrates a flow diagram of an embodiment of a method according to the present invention, where the build-up of an experience database is integrated with the actual operation. In step 201, it is determined whether operation of a node in the radio communication system would benefit from assistance of a repeater. If the benefit exists, the procedure continues to step 202, otherwise the procedure is ended in step 209. In step 202, a set of repeaters is selected based on the experience database using the present conditions for the user terminal to be assisted as input. In step 203, a radio signal is transmitted, from the base station to the repeaters in the selected set of repeaters. The radio signal is indicative of an order to promptly activate the respective repeater. The, possibly changed, communication conditions are monitored in step 204. The communication conditions are evaluated in step 205, and possibly additional information about communication conditions are provided to the experience database. In step 206, the selected set of repeaters is adapted, if necessary. In step 207, it is determined whether continued assistance of a repeater is requested. If that is the case, the process returns to step 203, providing activation orders to a possibly new set of repeaters. Any repeaters being removed from the adapted set of repeaters are at the same time deactivated. If the complete need is over, the procedure instead continues to step 208, where remaining repeaters are deactivated. The procedure ends in step 209.

The present invention provides means for introducing radio repeater in a cellular system without causing unnecessary interference in the network. The proposed method further reduces the power consumption of the radio repeaters. Its application is suited e.g. for packet data networks in which connections can take advantage of high instantaneous data rates during relatively short session times. Also, for power controlled links the method can reduce the output power.

Unlike solution based on relay-like nodes, repeaters can be activated in a very short period of time. A momentary lack of communication quality would not generally be possible to meet by using prior art relay registration methods, since the characteristics of the situation might be over when the relays finally come into operation. By instead using repeaters that typically do not need very much information to be able to be activated, at least in a basic configuration, more or less instantaneous assistance is possible to achieve. This is based on that an "order" is sent, which does not necessarily have to be confirmed or accompanied by any exchange of registration control signaling. The absolute orders together with the fast activation of the repeaters present features that are invaluable for e.g. for packet data networks.

One embodiment, autonomous to the stationary network, is that a mobile can send a control signal to a repeater (if any) or any other predetermined signal indicative of an order for activation of amplification.

In a second embodiment, the stationary network is involved. Base station sends control signal with some kind of ID of the repeater to be started. Here the base station or unit connected thereto can evaluate the result of different sets of activated repeaters and base future set of repeater ID's to be activated on such results.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

US 2004/0146013
US 2006/0166618
US 2007/0015462

The invention claimed is:

1. A method for controlling the operation of a repeater in a radio communication system, said method comprising:
   detecting, in said repeater, a radio signal being indicative of an order to promptly activate said repeater and comprising information identifying traffic to be amplified;
   activating amplification in said repeater promptly, responsive to said detecting said radio signal; and
   amplifying at least one of uplink traffic from a user terminal located in a vicinity of said repeater and downlink traffic to said user terminal;
   wherein said radio signal is a signal from a user terminal in a vicinity of said repeater, and wherein said radio signal has a predetermined feature.

2. The method of claim 1, wherein said radio signal is a control signal from said user terminal.

3. The method of claim 1, wherein said radio signal is provided in connection with each frame of data, and wherein said method further comprises deactivating said amplification in said repeater after amplification of said each frame.

4. The method of claim 1, further comprising:
   detecting, in said repeater, a radio signal being indicative of an order to deactivate said repeater; and
   deactivating said amplification in said repeater in response to said detecting of said radio signal being indicative of the order to deactivate said repeater.

5. The method of claim 1, wherein said amplifying comprises amplifying at least one of all uplink and all downlink traffic.

6. The method of claim 1, wherein the radio signal comprises a control signal, and wherein said amplifying comprises amplifying the traffic specified by the control signal.

7. A method for controlling the operation of a repeater in a radio communication system, said method comprising:
   determining whether operation of a user terminal in a vicinity of said repeater benefits from assistance of a repeater; and
   transmitting, from said user terminal, if said benefit exists, a radio signal to said repeater, said radio signal having a predetermined feature being indicative of an order to promptly activate said repeater.

8. The method of claim 7, wherein said radio signal is a control signal from said user terminal.

9. The method of claim 7, further comprising transmitting, from said node in said radio communication system, a radio signal being indicative of an order to deactivate said repeater.

10. The method of claim 7, further comprising evaluating communication quality as a function of a set of activated repeaters.

11. A repeater for use in a radio communication system, comprising:
   a detector configured to detect a radio signal being indicative of an order to promptly activate said repeater, said radio signal comprising information identifying traffic to be amplified and having a predetermined feature, and transmitted from a user terminal in the vicinity of said repeater;
   an amplifier arrangement configured to amplify at least one of uplink and downlink traffic; and a controller configured to activate said amplifier arrangement and connected to said detector, wherein said controller is configured to promptly activate said amplifier arrangement in response to said detector detecting said radio signal, to amplify at least one of the uplink traffic from said user terminal and the downlink traffic to said user terminal in accordance with the information received radio signal.

12. The repeater of claim 11, wherein said detector is configured to detect a control signal from said user terminal as said radio signal.

13. The repeater of claim 11, wherein said radio signal is provided in connection with each frame of data, and wherein said controller is configured to deactivate said repeater after amplification of said each frame.

14. The repeater of claim 11, wherein said detector is further arranged for detecting a radio signal being indicative of an order to deactivate said repeater, and wherein said controller is configured to deactivate said repeater in response to said detector detecting said radio signal being indicative of the order to deactivate said repeater.

15. The repeater of claim 11, wherein said amplifier arrangement is configured to amplify all uplink and downlink traffic.

16. The repeater of claim 11, wherein said amplifier arrangement is configured to amplify the traffic specified by control signaling.

17. A user terminal for use in a radio communication system, said node comprising:
- a radio link quality monitor configured to determine whether operation of said user terminal benefits from assistance of a repeater; and
- a transmitter configured to transmit an uplink radio signal being indicative of an order to promptly activate a repeater, in dependence on said radio link quality monitor determining that the operation benefits from the assistance of the repeater.

18. The user terminal of claim 17, wherein said transmitter is further arranged for transmitting a radio signal being indicative of an order to deactivate said repeater.

19. The user terminal of claim 18, wherein the user terminal is configured to evaluate communication quality as a function of a set of activated repeaters.

* * * * *

UNITED STATES PATENT AND TRADEMARK OFFICE
CERTIFICATE OF CORRECTION

PATENT NO. : 8,526,877 B2  Page 1 of 1
APPLICATION NO. : 12/747803
DATED : September 3, 2013
INVENTOR(S) : Almgren et al.

It is certified that error appears in the above-identified patent and that said Letters Patent is hereby corrected as shown below:

In the Drawings

In Fig. 13, Sheet 8 of 9, delete " 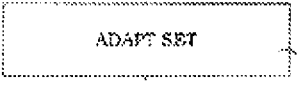 " and insert -- 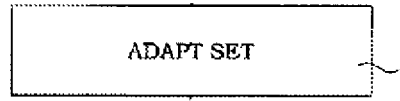 --, therefor.

In the Specification

In Column 4, Line 46, delete "transmitter 22" and insert -- transmitter 24 --, therefor.

In Column 5, Line 36, delete "transmitter 32" and insert -- transmitter 34 --, therefor.

In Column 5, Line 64, delete "Fore" and insert -- For --, therefor.

Signed and Sealed this
Twentieth Day of May, 2014

Michelle K. Lee
*Deputy Director of the United States Patent and Trademark Office*